(12) United States Patent
Sheffer

(10) Patent No.: US 6,299,179 B1
(45) Date of Patent: Oct. 9, 2001

(54) FLUID ACTUATED CHUCK

(75) Inventor: Dov Sheffer, Holon (IL)

(73) Assignee: R. S. R. Adtec Ltd., Ramat Gan (IL)

( * ) Notice: Subject to any disclaimer, the term of this patent is extended or adjusted under 35 U.S.C. 154(b) by 0 days.

(21) Appl. No.: 08/983,070

(22) PCT Filed: Mar. 22, 1996

(86) PCT No.: PCT/US96/03856

§ 371 Date: Apr. 16, 1998

§ 102(e) Date: Apr. 16, 1998

(87) PCT Pub. No.: WO96/29170

PCT Pub. Date: Sep. 26, 1996

(30) Foreign Application Priority Data

Mar. 22, 1995 (IL) ........ 113089

(51) Int. Cl.$^7$ ........ B23B 31/177; B23B 31/30
(52) U.S. Cl. ........ 279/4.12; 279/121; 279/157
(58) Field of Search ........ 279/2.09, 4.12, 279/110, 121, 157

(56) References Cited

U.S. PATENT DOCUMENTS

| | | |
|---|---|---|
| 2,695,176 | 11/1954 | Work . |
| 2,828,536 | 4/1958 | Kaiser . |
| 2,954,983 | 10/1960 | Roby . |
| 3,251,606 * | 5/1966 | Oswald et al. ........ 279/123 |
| 3,770,287 | 11/1973 | Weber et al. . |
| 3,797,837 | 3/1974 | Roddy et al. . |
| 4,114,909 | 9/1978 | Taitel et al. . |
| 4,139,207 | 2/1979 | Grimes . |
| 4,147,312 | 4/1979 | Secor et al. . |
| 4,200,301 | 4/1980 | Ryan . |
| 4,229,014 | 10/1980 | Crowe . |
| 4,317,577 | 3/1982 | Cameron . |
| 4,387,906 | 6/1983 | Nicolin . |
| 4,488,731 * | 12/1984 | Zaloof ........ 279/121 |
| 4,696,513 | 9/1987 | Nobukawa et al. . |
| 4,697,966 | 10/1987 | Baur . |
| 4,723,778 | 2/1988 | Kobayashi . |
| 4,771,963 | 9/1988 | Gattrugeri . |
| 4,793,053 | 12/1988 | Zuccaro et al. . |
| 4,890,541 | 1/1990 | Spooner . |
| 4,946,178 | 8/1990 | Korson et al. . |
| 4,953,877 | 9/1990 | Slachta et al. . |
| 4,979,853 | 12/1990 | Field . |
| 5,030,048 | 7/1991 | Massa . |
| 5,039,261 | 8/1991 | Takada . |
| 5,102,152 | 4/1992 | Grund et al. . |
| 5,110,146 | 5/1992 | Beere . |
| 5,125,776 | 6/1992 | Muller et al. . |
| 5,127,780 | 7/1992 | Massa . |
| 5,141,370 | 8/1992 | Baumann . |
| 5,174,585 | 12/1992 | Erkki . |
| 5,197,748 | 3/1993 | Wu . |
| 5,237,895 | 8/1993 | Danielsen . |
| 5,249,815 | 10/1993 | Beere . |
| 5,259,630 | 11/1993 | Ishii et al. . |
| 5,522,607 | 6/1996 | Chen . |
| 6,073,940 * | 6/2000 | Tabachenko et al. ........ 279/157 |

FOREIGN PATENT DOCUMENTS

| | | |
|---|---|---|
| 2192145 | 1/1988 | (GB) . |
| 2024010 | 1/1990 | (JP) . |

* cited by examiner

Primary Examiner—Steven C. Bishop
(74) Attorney, Agent, or Firm—Helfgott & Karas, PC

(57) ABSTRACT

This invention discloses a chuck apparatus actuated by a fluid including a body, a plurality of master jaws slidably mounted in the body, a fluid driven piston mounted for axial motion relative to the body along an axis, the piston comprising a plurality of bores extending therethrough along bore axes inclined with respect to the axis, and a plurality of shafts, each slidably mounted in one of the plurality of bores and being coupled to one of the master jaws, and wherein axial movement of the piston along the axis causes the plurality of shafts to move and to cause the plurality of master jaws to move therewith.

28 Claims, 3 Drawing Sheets

FLUID ACTUATED CHUCK

FIELD OF THE INVENTION

The present invention relates to pneumatic and hydraulic actuated chucks.

BACKGROUND OF THE INVENTION

Fluid actuated chucks, both pneumatic and hydraulic, are known in the art. U.S. Pat. Nos. 3,770,287, 4,114,909, 4,139,207, 4,147,312, 4,200,301, 4,229,014, 4,317,577, 4,387,906, 4,697,966, 4,771,963, 4,793,053, 4,890,541, 4,946,178, 4,953,877, 4,979,853, 5,030,048, 5,110,146, 5,125,776, 5,127,780, 5,141,370, 5,174,585, 5,237,895, 5,249,815 and 5,259,630 are believed to be representative of the prior art. In general, fluid actuated chucks include a piston which axially drives a centrally located wedge which engages chuck jaws. The axial movement of the wedge causes the jaws to move radially inwards or outwards.

One of the problems of prior art fluid actuated chucks is that the jaws are generally not sealed from possible contamination from chips and machining fluids. In certain machining operations, such as grinding, chips can degrade the performance of the chuck.

In general, the inner sliding portion of the jaws of prior art fluid actuated chucks has a T-shaped cross section. The plurality of tolerances in machining the sliding portion of the jaws and the corresponding channels in the chuck limits the accuracy and repeatability of the chuck usually to no better than one micron.

It is believed that the same plurality of tolerances is the cause of another problem associated with prior art chucks. The problem is that during operation at relatively high rotational speeds, the chuck jaws sometimes have a tendency to "self-open", that is, to loosen their grip on the workpiece.

In a perfectly manufactured chuck, the chuck jaws lie along axes which are coplanar. In actuality, due to the above mentioned tolerances, each chuck jaw does not lie exactly on its corresponding ideal axis. Rather, each end of each chuck jaw lies out of the ideal common plane of the ideal axes. During operation at relatively high rotational speeds, it is believed that relatively large centrifugal forces develop which cause the ends of the chuck jaws to become further displaced from the ideal common plane, thereby causing loosening of the workpiece.

SUMMARY OF THE INVENTION

The present invention seeks to provide a novel fluid actuated chuck which has better sealing properties, accuracy and repeatability than prior art fluid actuated chucks. A chuck constructed in accordance with a preferred embodiment of the present invention may have submicron repeatability even when it is made using the same conventional manufacturing techniques used in constructing prior art chucks.

In addition, a chuck constructed in accordance with a preferred embodiment of the present invention substantially prevents loosening of a workpiece even during relatively high rotational speeds.

There is thus provided in accordance with a preferred embodiment of the present invention a chuck actuated by a fluid including a body, a plurality of master jaws slidably mounted in the body, a fluid driven piston mounted for axial motion relative to the body along an axis, the piston including a plurality of bores extending therethrough along bore axes inclined with respect to the axis, and a plurality of shafts, each slidably mounted in one of the plurality of bores and being coupled to one of the master jaws, and wherein axial movement of the piston along the axis causes the plurality of shafts to move and to cause the plurality of master jaws to move therewith.

There is also provided in accordance with a preferred embodiment of the present invention a fluid actuated chuck including a body, a plurality of master jaws mounted for radial motion in a plane with respect to the body, a fluid driven piston mounted for axial motion relative to the body along an axis substantially perpendicular to the plane, the piston comprising a plurality of bores extending therethrough along bore axes inclined with respect to the axis and with respect to the plane, and a plurality of shafts, each slidably mounted in one of the plurality of bores and being coupled to one of the master jaws, and wherein axial movement of the piston along the axis causes the plurality of shafts to move radially relatively to the body and to cause the plurality of master jaws to move radially therewith.

In accordance with a preferred embodiment of the present invention, the plurality of bores and the plurality of shafts have corresponding generally circular cross sections.

Additionally in accordance with a preferred embodiment of the present invention, each master jaw is mounted for radial motion in a radial jaw bore, the plurality of master jaws and the plurality of radial jaw bores having corresponding generally circular cross sections. Preferably, each radial jaw bore is substantially sealed.

Further in accordance with a preferred embodiment of the present invention, the fluid actuated chuck also includes a plurality of seals operative to substantially seal the body, the plurality of master jaws, the piston and the plurality of shafts.

Still further in accordance with a preferred embodiment of the present invention, the fluid used to actuate the chuck is operative to lubricate the body, the plurality of master jaws, the piston and the plurality of shafts.

In accordance with a preferred embodiment of the present invention, a central shaft is provided for supplying pressurized air or hydraulic fluid to the piston for driving thereof.

Additionally in accordance with a preferred embodiment of the present invention, the plurality of master jaws are mounted such that displacement thereof is substantially prevented during operation at relatively high rotational speeds.

Further in accordance with a preferred embodiment of the present invention, a plurality of work jaws are fastened to the plurality of master jaws, such that the plurality of work jaws substantially seals the plurality of master jaws.

In accordance with a preferred embodiment of the present invention, each work jaw includes a generally axial tongue and each master jaw has a corresponding generally axial slot, such that the tongue fits into the slot.

The work jaws may be any shaped jaws such as soft jaws, pie jaws or half round jaws, and may be of different sizes and formed from a variety of materials.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 2:
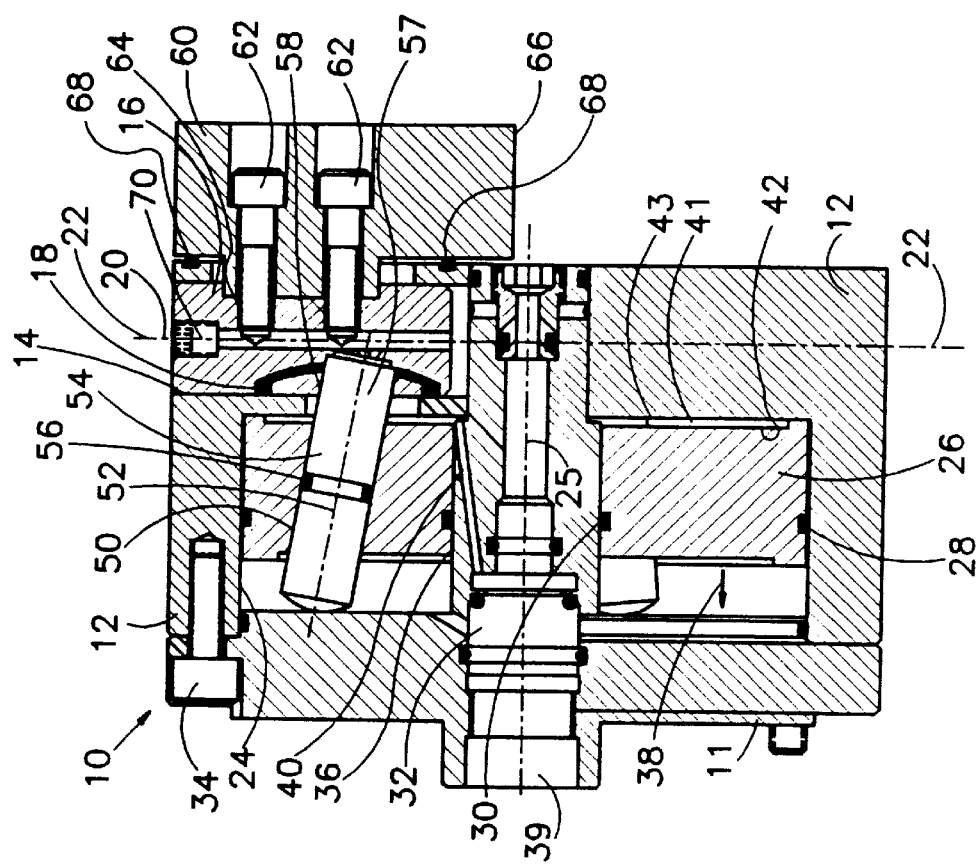
FIG. 2 is a side sectional view of the fluid actuated chuck of FIG. 1, taken along lines II—II in FIG. 1.
Figure 1:
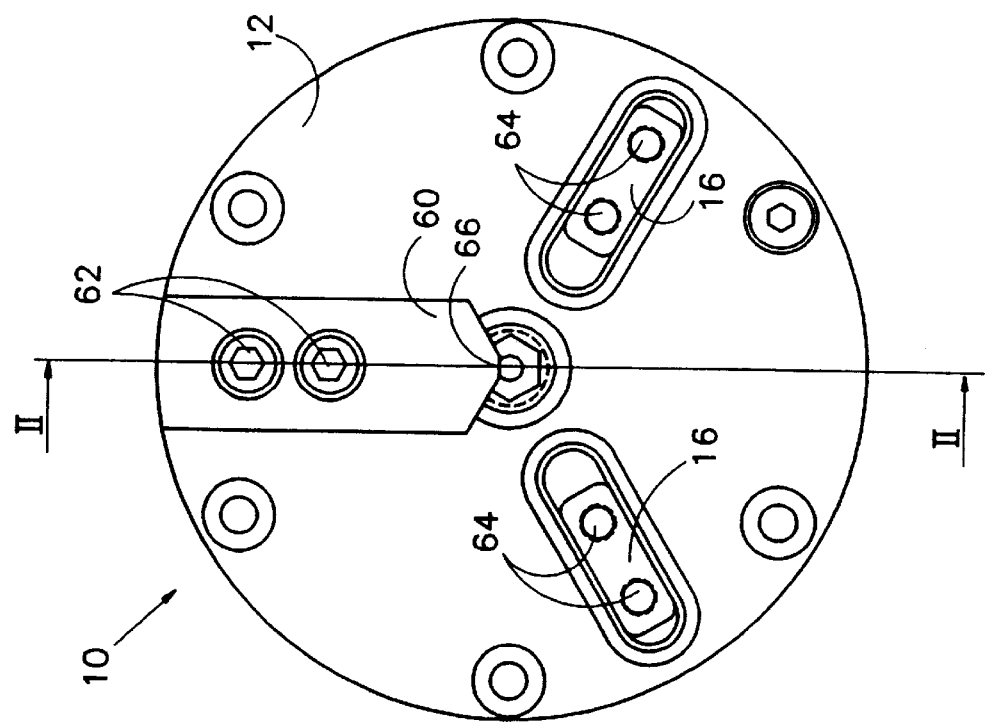
FIG. 1 is a front view illustration of a fluid actuated chuck constructed and operative in accordance with a preferred embodiment of the present invention, wherein jaws of the chuck are in a substantially open position.

Reference is now made to FIGS. 1 and 2 which illustrate respective front and side partially sectional views of a fluid actuated chuck 10 constructed and operative in accordance with a preferred embodiment of the present invention. The chuck 10 preferably is fastened to a machine tool (not shown), such as to a spindle of a lathe or a grinder, or to a table of a milling machine, by means of a flange 11. The chuck 10 comprises a body 12 which is preferably constructed of an alloy steel.

The chuck 10 preferably comprises a plurality of radial jaw bores 14 in each of which is mounted a master jaw 16. The master jaws 16 are preferably made of an alloy steel. The embodiment illustrated in FIGS. 1 and 2 has three jaw bores 14 and three master jaws 16, although it is appreciated by persons skilled in the art that other embodiments of the present invention may include a different number of bores and jaws.

Each jaw bore 14 and master jaw 16 preferably have corresponding, generally concentric circular cross sections. The jaw bores 14 along with each corresponding master jaw 16 are radially spaced substantially equally from one another. In the illustrated embodiment, the spacing is substantially 120 degrees.

Preferably associated with each master jaw 16 is a dynamic seal 18 which substantially seals the interface of the body 12 and each master jaw 16 from contamination.

Associated with each master jaw 16 is a radial axis 20 along which the master jaw 16 slides. The plurality of axes 20 of the plurality of master jaws 16 are substantially coplanar and define a plane 22.

The body 12 is provided with an inner race 24 whose central axis 25 is substantially perpendicular to the axis 22. Slidably mounted in the race 24 is a fluid driven piston 26 which is preferably provided with a plurality of dynamic seals, such as seals 28 and 30. The race 24 and the piston 26 preferably have corresponding, substantially concentric circular cross sections. Piston 26 is thus substantially concentric with the axis 25. The piston 26 moves substantially axially relative to the body 12 substantially along the axis 25.

It is important to note that the tolerances achievable in machining the generally circular race 24, piston 26, jaw bores 14 and master jaws 16 are generally tighter than the tolerances achievable with prior art chucks. Prior art chuck jaws generally have T-shaped cross sections which inherently have more surfaces to be machined than circular cross sections. An increase in the surfaces which have to be machined means an increase in the total tolerance sum.

The piston 26 is preferably driven pneumatically via a fluid central shaft 32. Alternatively, the piston 26 may be driven hydraulically, typically by means of a remote shaft operatively connected with to a hydraulic power source as is known in the art.

The central shaft 32 is preferably attached to the body 12 by means of screws 34. The operation of the central shaft 32 and the ensuing axial motion of the piston 26 is described hereinbelow.

The piston 26 is provided with a plurality of bores 50 extending therethrough along bore axes 52 inclined with respect to the axis 25 and with respect to the plane 22. Slidably mounted in each bore 50 is a shaft 54 which is preferably provided with a dynamic seal 56. Each bore 50 and shaft 54 correspond to one of the plurality of master jaws 16. Each shaft 54 is coupled at an end 57 thereof to a recess 58 in the corresponding master jaw 16. Each shaft 54 is preferably constructed of tool steel.

Figure 5A:
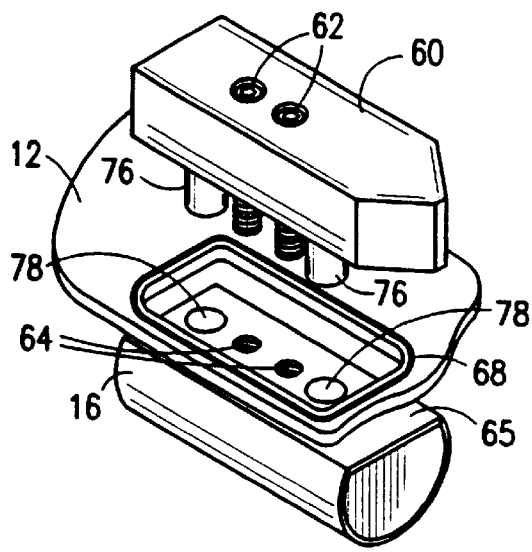
FIGS. 5A and 5B are simplified pictorial illustrations of accurate positioning of the work jaws with respect to the master jaws, as known in the art.
Figure 5B:
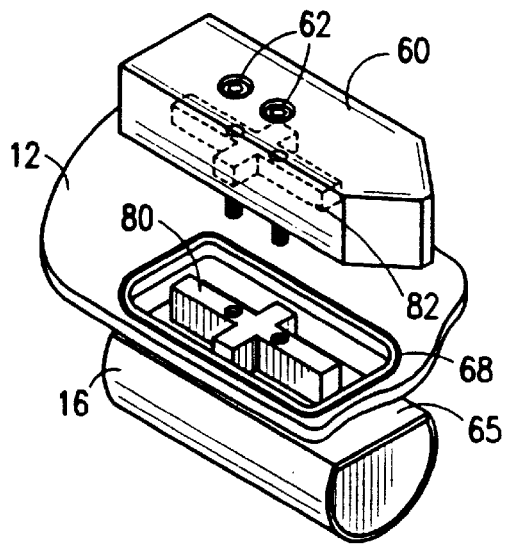
Figure 5C:
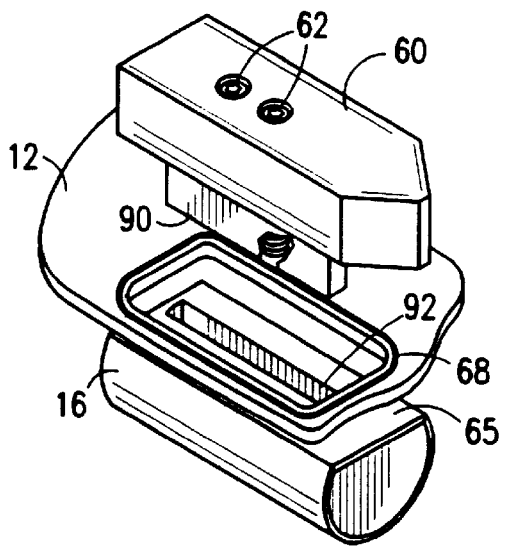
FIGS. 5C is a simplified pictorial illustration of accurate positioning of the work jaws with respect to the master jaws in accordance with a preferred embodiment of the present invention.

Preferably associated with each master jaw 16 is a work jaw 60 which is attached to the master jaw 16 preferably by means of screws 62 which are screwed into threaded holes 64 in the master jaw 16. In order to facilitate engagement of the screws 62 in the master jaw 16, the master jaw 16 may be formed with a generally flat face 65, as shown in FIGS. 5A–5C.

The work jaws 60 may be any standard jaw of any size known in the art, such as soft jaws, pie jaws, or half circle jaws, and typically may be constructed of an aluminum alloy, mild steel or low alloy steel.

The interface between each work jaw 60 and each master jaw 16 is preferably substantially sealed by seals 68, as shown in FIGS. 2, 4 and 5A–5C.

It should be noted that generally the entire perimeter of each master jaw 16 is enveloped by the corresponding jaw bore 14. The generally flat face 65 does not extend the full axial length of the master jaw 16.

As is known in the art, the work jaw 60 must be positioned accurately with respect to the master jaw 16 before fastening the screws 62. Reference is now made to FIGS. 5A–5C which illustrate alternative methods of accurately positioning the work jaw 60 with respect to the master jaw 16.

As seen in FIG. 5A, the work jaw 60 may include a plurality of pins 76 which mate with corresponding sockets 78 in the master jaw 16, as is known in the art.

Alternatively, as seen in FIG. 5B, the master jaw 16 may include a pair of generally orthogonal tongues 80 which mate with corresponding slots 82 in the work jaw 60, as is known in the art. The arrangement illustrated in FIG. 5B is typically more accurate than the arrangement shown in FIG. 5A.

Reference is now made to FIG. 5C which illustrates a further alternative method of accurately positioning the work jaw 60 with respect to the master jaw 16 in accordance with a preferred embodiment of the present invention. The work jaw 60 comprises a generally axial tongue 90 which fits into a corresponding generally axial slot 92 in the master jaw 16. This arrangement has been found to be as accurate as the arrangement of FIG. 5B and is easier to machine.

The clamping action of the chuck 10 is now described with reference to FIGS. 1 and 2. The chuck 10 is illustrated in FIGS. 1 and 2 in a substantially open configuration. A workpiece (not shown) is centrally inserted between ends 66 of the work jaws 60. The workpiece is then clamped by moving the master jaws 16 and the work jaws 60 radially inwards thereagainst as described hereinbelow.

In order to move the master jaws 16 and the work jaws 60 radially inwards, the piston 26 is driven backwards in the direction of arrow 38, shown in FIG. 2, by the action of a fluid entering an inlet port 39 of the central shaft 32, passing through an elongate channel 40 of the central shaft 32 and entering a cavity 41 formed between a front face 42 of the piston 26 and a rear face 43 of the body 12.

The fluid pressure in the cavity 41 pushes against the face 42 of the piston 26 and thereby causes the piston 26 to move backwards along the axis 25 in the direction of arrow 38. Since each axis 52 of each shaft 54 is inclined with respect to the axis 25, the axial movement of the piston 26 in the direction of arrow 38 causes each shaft 54 to slide radially inwards.

Figure 4:
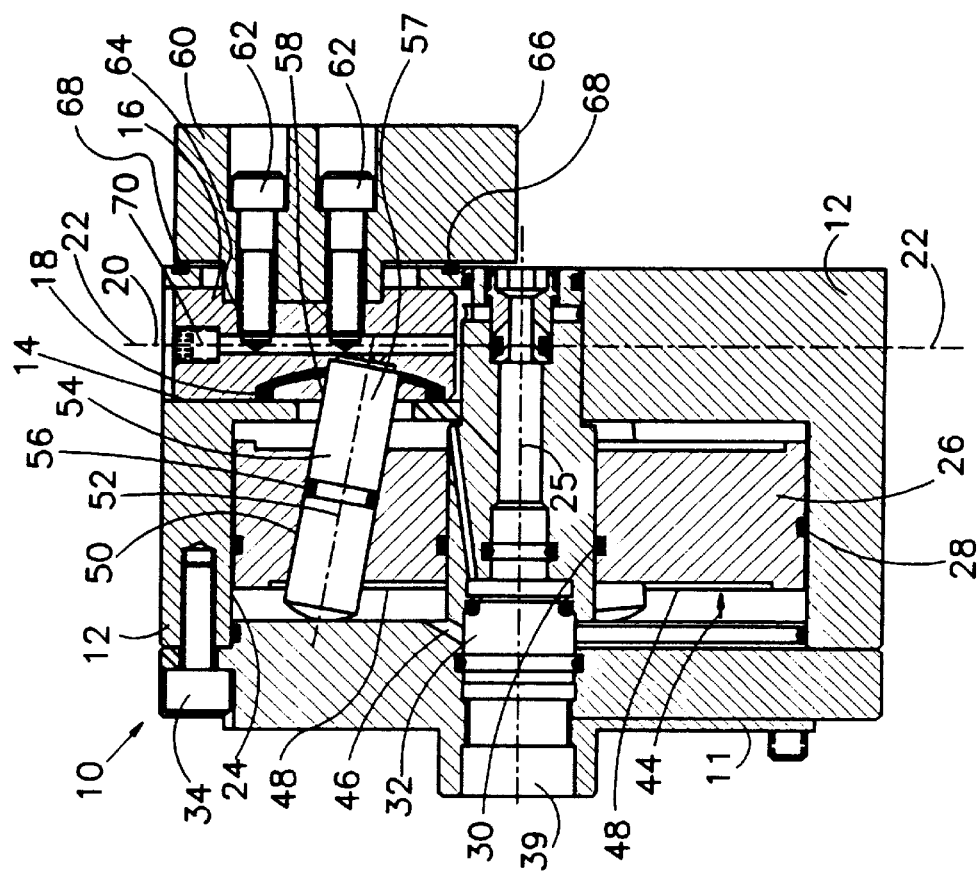
FIG. 4 is a side sectional view of the fluid actuated chuck of FIG. 3, taken along lines IV—IV in FIG. 3.
Figure 3:
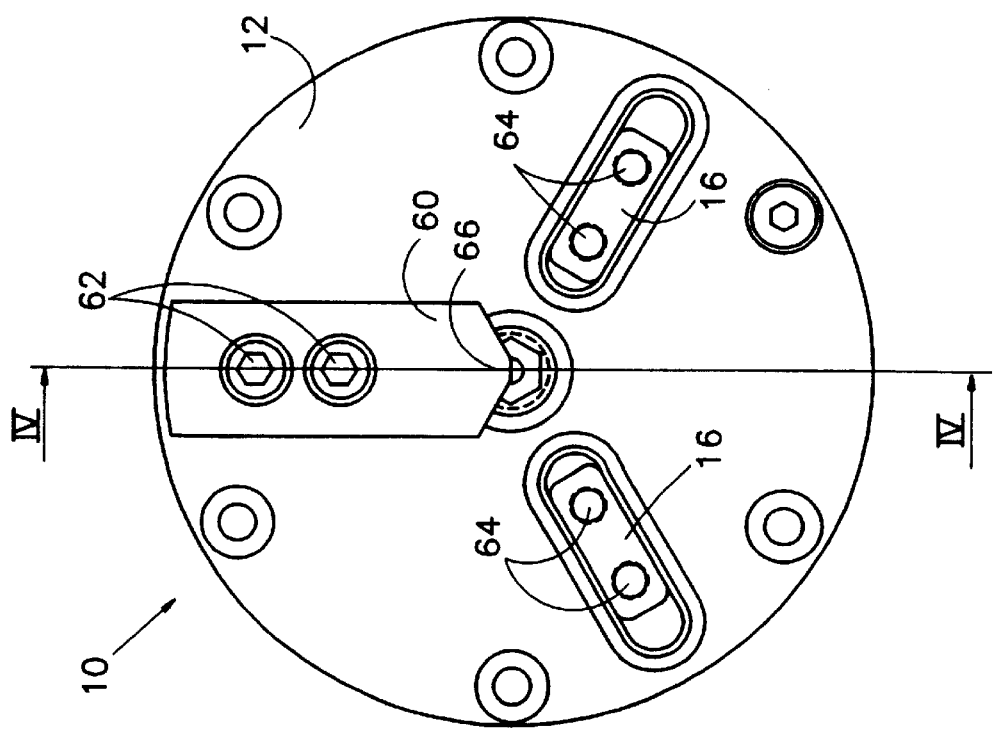
FIG. 3 is a front view illustration of the fluid actuated chuck of FIG. 1, wherein jaws of the chuck are in a substantially closed position.

Since the end 57 of each shaft 54 is coupled to the corresponding master jaw 16, which is in turn fastened to the corresponding work jaw 60 by means of the screws 62, the radially inward motion of the shafts 54 causes the master jaws 16 and the work jaws 60 to move radially inwards, as shown in FIGS. 3 and 4. The work jaws 60 thus move radially inwards and clamp the workpiece (not shown).

Typically the diametral movement of the master jaws 16 and the work jaws 60 is 1–3 mm, as is known in the art.

Release of the workpiece is now described with reference to FIGS. 3 and 4.

In order to move the master jaws 16 and the work jaws 60 radially outwards, the piston 26 is driven forwards in the direction of arrow 44, opposite to the direction of arrow 38 shown in FIG. 2, by the action of fluid entering the inlet port 39, passing through a rear channel 46 of the central shaft 32 and pushing against a rear face 48 of the piston 26 in the direction of arrow 44, thereby causing the piston 26 to move forwards along the axis 25 in the direction of arrow 44.

Since each axis 52 of each shaft 54 is inclined with respect to the axis 25, the axial movement of the piston 26 in the direction of the arrow 44 causes each shaft 54 to slide radially outwards. The radially outward motion of the shafts 54 causes the master jaws 16 and the work jaws 60 to move radially outwards, thereby releasing the workpiece (not shown).

Conventional valve devices known in the art are used to direct the flow of fluid either to channel 40 or to channel 46.

It is appreciated from the foregoing description that the fluid which actuates the chuck 10 also serves to lubricate the body 12, the plurality of master jaws 16, the piston 26 and the plurality of shafts 52. Optionally associated with each master jaw is a lubrication hole 70, shown in FIGS. 2 and 4, although in a preferred embodiment of the present invention the chuck 10 is adequately lubricated even without holes 70.

It will be appreciated by persons skilled in the art that the present invention is not limited to what has been particularly shown and described hereinabove. Rather, the scope of the present invention is defined only by the claims that follow.

What is claimed is:

1. A chuck actuated by a fluid comprising:
   a body;
   a plurality of master jaws slidably mounted in said body;
   a fluid driven piston mounted for axial motion relative to said body in a cavity along an axis, said piston comprising a plurality of bores extending therethrough along bore axes inclined with respect to said axis; and
   a plurality of shafts, each slidably and non-pivotably mounted in one of said plurality of bores and being coupled to one of said master jaws at one end of each shaft, and engaging a wall of said cavity at the opposite end of each shaft, and wherein
   axial movement of said piston along said axis causes said plurality of shafts to move and cause said plurality of master jaws to move therewith.

2. Apparatus according to claim 1 and wherein said plurality of bores and said plurality of shafts have corresponding generally circular cross sections.

3. Apparatus according to claim 1 and wherein each said master jaw is mounted for radial motion in a radial jaw bore, said plurality of master jaws and said plurality of radial jaw bores having corresponding generally circular cross sections.

4. Apparatus according to claim 3 and wherein said radial jaw bore is substantially sealed.

5. Apparatus according to claim 1 and also comprising a plurality of seals operative to substantially seal said body, said plurality of master jaws, said piston and said plurality of shafts.

6. Apparatus according to claim 1 and wherein said fluid is operative to lubricate said body, said plurality of master jaws, said piston and said plurality of shafts.

7. Apparatus according to claim 1 and further comprising a central shaft for supplying pressurized air to said piston for driving thereof.

8. Apparatus according to claim 1 and further comprising a central shaft for supplying pressurized hydraulic fluid to said piston for driving thereof.

9. Apparatus according to claim 1 and wherein said plurality of master jaws are mounted such that displacement thereof is substantially prevented during operation at relatively high rotational speeds.

10. Apparatus according to claim 1 and further comprising a plurality of work jaws which are fastened to said plurality of master jaws, such that said plurality of work jaws substantially seals said plurality of master jaws.

11. Apparatus according to claim 10 and wherein each said work jaw comprises a generally axial tongue and each said master jaw has a corresponding generally axial slot, such that said tongue fits into said slot.

12. Apparatus according to claim 10 and wherein said work jaws are soft jaws.

13. Apparatus according to claim 10 and wherein said work jaws are pie jaws.

14. Apparatus according to claim 10 and wherein said work jaws are half circle jaws.

15. A chuck actuated by a fluid comprising:
   a body;
   a plurality of master jaws mounted for radial motion in a plane with respect to said body;
   a fluid driven piston mounted for axial motion relative to said body in a cavity along an axis substantially perpendicular to said plane, said piston comprising a plurality of bores extending therethrough along bore axes inclined with respect to said axis and with respect to said plane; and
   a plurality of shafts, each slidably and non-pivotably mounted in one of said plurality of bores and being coupled to one of said master jaws at one end of each shaft, and engaging a wall of said cavity at the opposite end of each shaft, and wherein
   axial movement of said piston along said axis causes said plurality of shafts to move radially relative to said body and to cause said plurality of master jaws to move radially therewith.

16. Apparatus according to claim 15 and wherein said plurality of bores and said plurality of shafts have corresponding generally circular cross sections.

17. Apparatus according to claim 15 and wherein each said master jaw is mounted for radial motion in a radial jaw bore, said plurality of master jaws and said plurality of radial jaw bores having corresponding generally circular cross sections.

18. Apparatus according to claim 17 and wherein said radial jaw bore is substantially sealed.

19. Apparatus according to claim 15 and also comprising a plurality of seals operative to substantially seal said body, said plurality of master jaws, said piston and said plurality of shafts.

20. Apparatus according to claim 15 and wherein said fluid is operative to lubricate said body, said plurality of master jaws, said piston and said plurality of shafts.

21. Apparatus according to claim 15 and further comprising a central shaft for supplying pressurized air to said piston for driving thereof.

22. Apparatus according to claim 15 and further comprising a central shaft for supplying pressurized hydraulic fluid to said piston for driving thereof.

23. Apparatus according to claim 15 and wherein said plurality of master jaws are mounted such that displacement thereof is substantially prevented during operation at relatively high rotational speeds.

24. Apparatus according to claim 15 and further comprising a plurality of work jaws which are fastened to said plurality of master jaws, such that said plurality of work jaws substantially seals said plurality of master jaws.

25. Apparatus according to claim 24 and wherein each said work jaw comprises a generally axial tongue and each said master jaw has a corresponding generally axial slot, such that said tongue fits into said slot.

26. Apparatus according to claim 24 and wherein said work jaws are soft jaws.

27. Apparatus according to claim 24 and wherein said work jaws are pie jaws.

28. Apparatus according to claim 24 and wherein said work jaws are half circle jaws.

* * * * *